W. CANTRELL.
REPLANTER.
APPLICATION FILED JULY 9, 1917.
1,265,290.
Patented May 7, 1918.
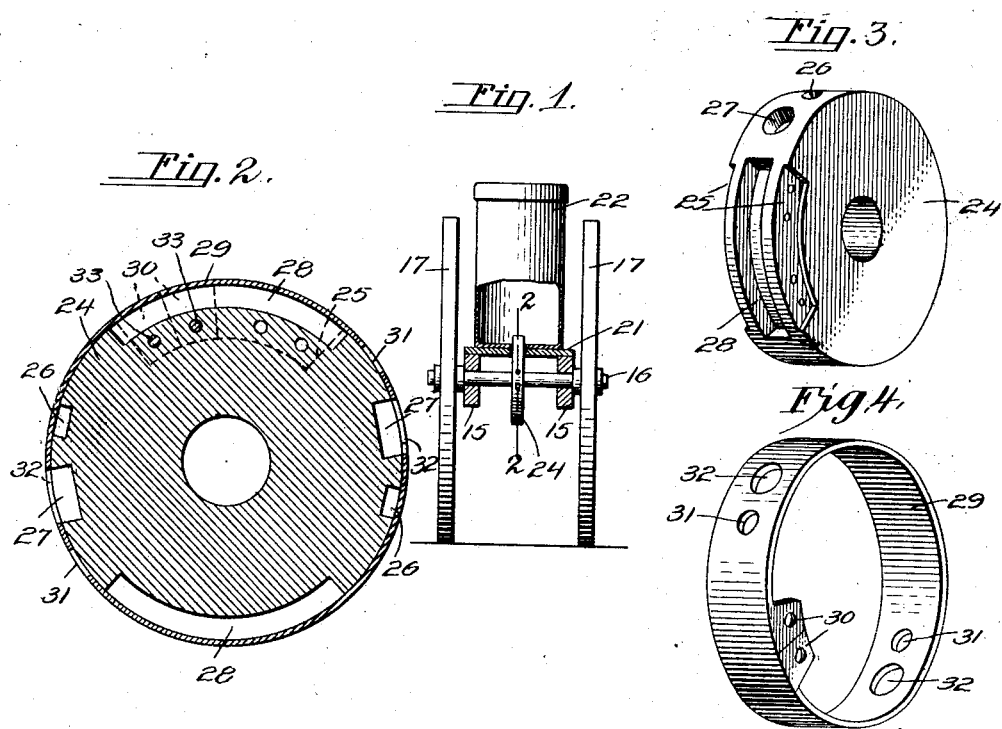
WITNESSES
F. C. Gibson.
Eva W. Springer.
INVENTOR
William Cantrell.
BY Victor J. Evans
ATTORNEY

UNITED STATES PATENT OFFICE.

WILLIAM CANTRELL, OF FORT WORTH, TEXAS.

REPLANTER.

1,265,290.

Specification of Letters Patent.

Patented May 7, 1918.

Application filed July 9, 1917. Serial No. 179,486.

*To all whom it may concern:*

Be it known that I, WILLIAM CANTRELL, a citizen of the United States, residing at Fort Worth, in the county of Tarrant and State of Texas, have invented new and useful Improvements in Replanters, of which the following is a specification.

This invention relates to replanters and it has for its object to produce a simple and improved device capable of being readily attached to and used in combination with an ordinary cultivator for the purpose of planting seeds where the seeds previously planted have failed to sprout as will appear at the time when the plants are first cultivated.

A further object of the invention is to produce a simple and effective device of the class described whereby seeds of various kinds such as maize, cane, corn or cotton seed may be planted or replanted in the desired places.

A further object of the invention is to produce a simple and effective replanting device which may be readily applied and used in connection with a cultivator of ordinary conventional construction.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawings,—

Figure 1 is a view in rear elevation, partly in section, of any planter constructed in accordance with the invention.

Fig. 2 is a sectional view enlarged of the seed wheel taken on the line 2—2 in Fig. 1.

Fig. 3 is a perspective detail view of the seed wheel and the circumferential band of the same, the band having been detached.

Fig. 4 is a perspective detail view of the band.

Corresponding parts in the several figures are denoted by like characters of reference.

The frame of the replanter includes side members 15 which are suitably connected together and spaced apart, said side members affording bearings for an axle 16 having ground wheels 17. The frame supports a platform 21 on which is mounted a seed box or hopper 22.

Mounted on the axle 16 for rotation therewith, is the seed wheel 24, the same consisting of a disk, the opposite side faces of which are provided with arcuate recesses 25. The circumferential edge or perimeter of the seed wheel is provided with diametrically opposite recesses 26 forming seed cups for small seed such as cane seed. Adjacent to the small recesses 26 are larger diametrically opposite recesses 27 forming seed pockets for larger seed such as corn. Intermediate the pockets 26, 27 at diametrically opposite sides of the wheel are formed elongated recesses 28 constituting pockets for planting cotton seed. The wheel 24 is surrounded by a circumferential rim or band 29 which is preferably made of resilient sheet metal such as brass or steel and which is provided at the ends thereof with angularly disposed lugs 30 which are accommodated in the recesses 25 in the opposite side faces of the wheel or disk, said recesses 25 being, however, of such extent as to permit the position of the rim or band 29 to be shifted about the axis of the wheel. The rim or band 29 is provided with openings 31 adapted to register with the small recesses or pockets 26, the larger pockets 27 being meanwhile covered. By shifting the position of the rim or band, the pockets 26 may be covered and larger openings 32 in the band may be placed in registry with the larger seed pockets 27. The band may be retained in either of the positions just described by means of screws 33 extending through the lips or lugs 30 and engaging the body of the wheel. When cotton is to be planted the set screws are removed and the band 21 is detached, the cotton seed will then be received in the elongated grooves 28 of the wheel and discharged through the chute 19 in a similar manner as the small seeds would be discharged when required.

In operation the improved replanter is to be suitably connected with a cultivator of ordinary well known construction, the connection being effected in such a manner as to enable the replanter to be raised from the ground or lowered until the ground wheels 17 are in ground engaging position. The replanter is obviously to be supported in an elevated position whenever the plants in the row have properly sprouted; in places where the plants have not sprouted the replanter is lowered to place the wheels 17 in ground engaging position, thereby causing the seed wheel to be rotated and seed to be deposited in the desired places. Such means for attaching a replanter to a cultivator and for raising and lowering the same are, however, well known in the art and it is not deemed necessary to particularly describe or illustrate the same.

What is claimed, is:—

1. In a replanter, a seed wheel mounted for rotation, said wheel having seed pockets of different sizes formed therein, pockets of similar size being disposed in diametrically opposite relation, said wheel being also provided with diametrically opposite elongated grooves and a detachable band surrounding the wheel and having apertures adapted to register with the seed pockets of different sizes.

2. In a device of the class described, a seed wheel having circumferentially disposed seed pockets of different sizes, pockets of equal size being arranged in diametrically opposite relation, said wheel being also provided with elongated grooves arranged in diametrically opposite relation, said wheel being provided with arcuate recesses in the end faces thereof, in combination with a split resilient band surrounding the wheel and having terminal lugs seated and secured adjustably in the opposite recesses, said band being adapted for limited movement about the axis of the wheel and said band being provided with apertures adapted to be placed in registry with the variously sized seed pockets.

In testimony whereof I affix my signature.

WILLIAM CANTRELL.

Copies of this patent may be obtained for five cents each, by addressing the "Commissioner of Patents, Washington, D. C."